Oct. 15, 1929. T. C. McKINLEY 1,731,253
DRAWING AND FLATTENING SHEET GLASS
Filed May 7, 1924
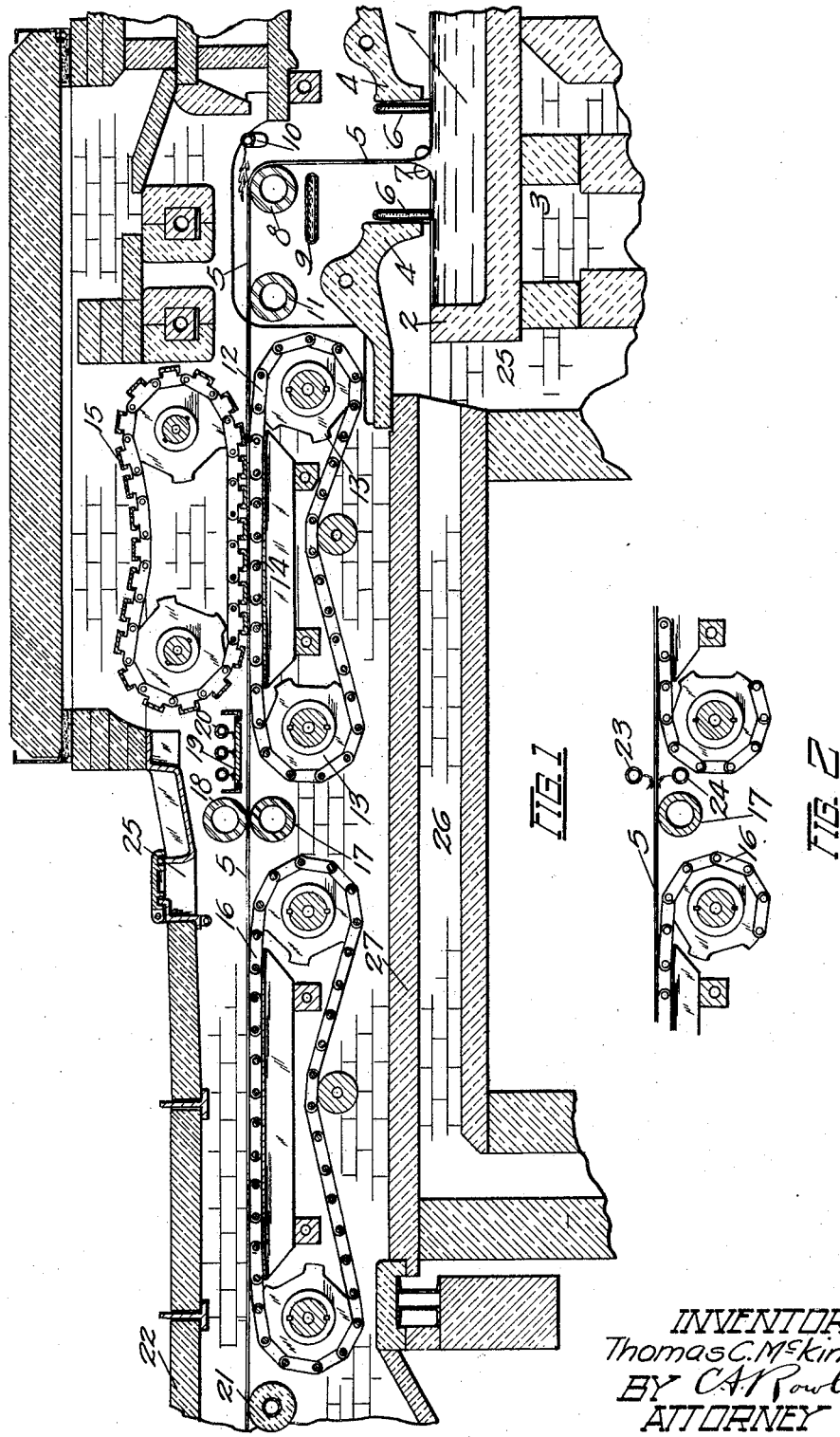
INVENTOR
Thomas C. McKinley
BY C.A.Rowley
ATTORNEY Patented Oct. 15, 1929

1,731,253

UNITED STATES PATENT OFFICE

THOMAS C. McKINLEY, OF CHARLESTON, WEST VIRGINIA, ASSIGNOR TO THE LIBBEY-OWENS GLASS COMPANY, OF TOLEDO, OHIO, A CORPORATION OF OHIO

DRAWING AND FLATTENING SHEET GLASS

Application filed May 7, 1924. Serial No. 711,524.

This invention relates to improvements in the art of drawing sheet glass, and more particularly to an improved method and apparatus for flattening the drawn glass sheet.

In the system of drawing sheet glass, as shown for example in the patent to I. W. Colburn, 1,248,809, granted December 4, 1917, a sheet of glass is drawn upward continuously from a shallow pool of molten glass and then while still somewhat plastic is deflected about a cooled bending roller into a horizontal plane. The sheet is then reheated and carried through a combined drawing and flattening mechanism, wherein the sheet becomes set in final sheet form, and then passed horizontally through an annealing leer.

According to the modification of this system here disclosed, a mechanism of the same type heretofore used for drawing and flattening the sheet is employed, but this mechanism is used simply for drawing the sheet continuously from the molten source and is not entirely relied upon as a flattening means. This drawing means is made shorter than has heretofore been the case, and after emerging from this drawing means the sheet is again submitted to a temperature treatment whereby it is softened, and is then passed over a second moving flattening table whereupon it is allowed to settle into the desired flat sheet form. Since this second flattening table and the reheating means associated therewith are removed and made distinct from the original drawing process, the temperature conditions of both the drawing mechanism and the flattening mechanism can be separately adjusted and more desirable temperature conditions maintained in each process individually than has heretofore been the case when both processes were carried on simultaneously.

The invention will be more clearly understood from the following detailed description of certain approved forms of the mechanism.

In the accompanying drawings:

Fig. 1 is a longitudinal vertical section through the drawing and flattening mechanism.

Fig. 2 is a partial sectional view, similar to Fig. 1, showing a different form of reheating mechanism.

The shallow pool of molten glass 1 in receptacle 2 is in open communication with a continuous tank furnace or other source of supply, and the molten pool 1 is maintained at the proper working temperature by the heating chamber 3 over which receptacle 2 is supported. All of the glass in receptacle 2, except a comparatively narrow strip at each side of the sheet source, is enclosed by a pair of cover-tiles 4, and the glass sheet 5 is drawn upwardly from the exposed surface portion of molten pool 1 between a pair of water-cooled shields 6, which protect the sheet source from the heated gases which would otherwise flow out against the sheet from under the lip-tiles 4, and also serve to chill the surface glass to the proper sheet-drawing temperature. Pairs of driven edge-gripping rollers 7 engage each edge of the glass sheet 5 at its source to maintain the same at the desired constant width. Sheet 5 is drawn upwardly until substantially set in sheet form but still sufficiently plastic to be deflected into the horizontal plane about a cooled bending roller 8. A water-cooled shield 9 beneath bending roll 8 serves to lower the temperature of the inner side of sheet 5 and the outer surface of roll 8 so that the sheet will not stick to the roller or be marred thereby. A reheating burner 10 plays upon the sheet 5 just as it leaves the roller 8, and softens it sufficiently so that the curves or corrugations imparted thereto by its passage over roller 8 may be drawn out in the horizontal run of the sheet. The sheet then passes over an intermediate supporting roller 11 onto the drawing mechanism.

This drawing mechanism may be of the same form disclosed in the Colburn patent hereinabove referred to, except that it is made considerably shorter. It need only be long enough to maintain the necessary drawing grip upon a portion of the horizontal run of the sheet. This drawing mechanism comprises a suitably driven supporting table 12 formed of a plurality of intermeshing, pivotally connected links. These links form an endless belt or apron carried at its ends upon driven sprockets 13, and the upper horizontal run sliding over the upper flat surface of a stationary supporting table 14. This upper horizontal run of table 12 forms a flat moving supporting surface for the glass sheet. Above the sheet is a second endless belt of draw bars 15 which rest upon the edge portions of the sheet to hold the sheet in frictional drawing contact with table 12. Cross-bars 15 are preferably bowed upwardly at their central portion so that only the edges of these bars rest upon the edges of the glass sheet. It will be seen that the sheet is gripped at its edges between the two plates 12 and 15, which are driven at the same speed so as to draw the sheet continuously from its molten source. As stated above, all of this mechanism may be substantially the same as described more in detail in the prior Colburn patents, except that the belts 12 and 15 may be made considerably shorter than has heretofore been the case.

After emerging from this drawing mechanism, the sheet passes through a suitable reheating zone and thence onto a second flattening table 16. This flattening table 16 and its supporting and driving means may be the same in all respects as the table 12 and its auxiliary devices, except that table 16 will preferably be considerably longer than table 12.

As shown in Fig. 1, the sheet 5 in its passage through the reheating zone between tables 12 and 16 is supported by an intermediate roller 17, and a similar roller 18 may be provided above the sheet to hold the sheet down in contact with the supporting roller 17. Before the sheet 5 passes between rollers 17 and 18, it passes under a reheating mechanism here shown as a suitably supported carborundum plate 19 positioned closely above the surface of the glass sheet, and having a plurality of burners 20 playing on its upper surface. The heat from burners 20 is radiated evenly from the lower surface of plate 19 onto the glass sheet 5, thus reheating it to a proper flattening temperature. If the roller 18 is employed the two rollers 17 and 18 act to positively roll out any corrugations or warped areas which might be present in the previously formed sheet, and whether or not roll 18 is used, the reheated and softened sheet, after passing onto the upper surface of the moving flattening table 16, will settle thereon and become absolutely flat before it passes off from the farther end of table 16 onto the conveying rollers 21 in the leer 22.

Many different modifications of the reheating means between the drawing and flattening mechanism might be employed. For example in Fig. 2, a pair of burners 23 and 24 play upon the upper and lower surfaces respectively of sheet 5 before it passes onto the flattening table 16. A burner such as 24 might be employed in connection with the reheating plate 19 shown in Fig. 1, or heat-radiating devices such as shown in Fig. 1 might be employed both above and below the sheet.

A pair of rolls such as 17 and 18 for positively rolling out any curvatures in the glass sheet, is more adapted for use in an apparatus designed for drawing heavy sheet glass which is subsequently to be resurfaced, to produce polished plate glass. In this case it is desirable to secure as flat a sheet as possible even at the expense of any surface defects which might be caused by the contact of the pressure rolls 17 and 18 on the two sides of the sheet. When it is desired to retain the original fire-polished surfaces of the sheet, as in the production of ordinary drawn sheet glass, the roller 18 is preferably omitted as shown in Fig. 2.

As shown in Fig. 1, heated gases from the furnace 3 beneath the draw-pot 2 are conducted up through passage 25 and through horizontal passage 26 beneath the drawing and flattening tables 12 and 16. The heat radiated from these gases through the cover plate 27 aids in maintaining the desirable temperature conditions in the chamber housing these drawing and flattening tables. If desired, or found necessary, additional burners or other heaters may be used in this chamber.

The bait, with which the sheet drawing process is first started, is removed through opening 25 in the top of the housing for the flattening apparatus.

Claims:

1. In the art of drawing continuous sheet glass from a mass of molten glass, the process of successively passing a continuous sheet through drawing means, rolling means, flattening means and annealing means.

2. In the art of drawing continuous sheet glass from a mass of molten glass, the process of drawing and flattening the sheet, reheating the sheet by radiated heat, rolling the sheet, and again flattening it before the sheet is cut into lengths.

3. In the art of drawing continuous sheet glass from a mass of molten glass, the process of drawing the sheet upwardly, bending it into a horizontal plane, passing it through drawing means, through rolling means, through flattening means, and then annealing the sheet all before the sheet is cut into lengths.

4. In the art of drawing continuous sheet glass from a mass of molten glass, the process of drawing the sheet upwardly, bending it into a horizontal plane, passing it through drawing means, and then successively reheating it by radiated heat, rolling, flattening and then annealing the continuous sheet before it is cut into lengths.

5. In the art of drawing continuous sheet glass from a mass of molten glass, the process of drawing the sheet upwardly, bending it into a horizontal plane, reheating the sheet, passing it through a drawing means, again reheating the sheet by radiated heat, rolling it, flattening it, and then annealing it before it is cut into lengths.

Signed at Charleston, in the county of Kanawha and State of West Virginia, this 3rd day of May, 1924.

THOMAS C. McKINLEY.